(12) United States Patent
Iwasaki et al.

(10) Patent No.: US 7,091,149 B2
(45) Date of Patent: Aug. 15, 2006

(54) ELECTRODE FOR FUEL CELL, METHOD OF MANUFACTURING SAME, AND FUEL CELL WITH SUCH ELECTRODE

(75) Inventors: Kazuhiko Iwasaki, Hiki-gun (JP); Tsugio Ohba, Asaka (JP); Takeshi Miyama, Asaka (JP); Minako Onodera, Bunkyo-ku (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 253 days.

(21) Appl. No.: 10/187,552

(22) Filed: Jul. 1, 2002

(65) Prior Publication Data
US 2003/0022057 A1    Jan. 30, 2003

(30) Foreign Application Priority Data
Jul. 2, 2001   (JP) ............................. 2001-201497

(51) Int. Cl.
 *B01J 21/18*   (2006.01)
 *B05D 5/12*    (2006.01)
 *B29C 65/00*   (2006.01)
 *B32B 37/00*   (2006.01)

(52) U.S. Cl. ................. 502/101; 502/185; 427/115; 156/87; 156/247

(58) Field of Classification Search ............... 502/101, 502/185; 427/115, 370, 402; 156/87, 247, 156/308.2, 309.6, 286, 344
See application file for complete search history.

(56) References Cited

U.S. PATENT DOCUMENTS

| | | | | |
|---|---|---|---|---|
| 4,377,496 A * | 3/1983 | Solomon | .................... | 502/101 |
| 4,446,210 A | 5/1984 | Okada et al. | | |
| 4,501,803 A * | 2/1985 | Bannochie | .................. | 429/101 |
| 4,568,442 A * | 2/1986 | Goldsmith | .................. | 204/284 |
| 4,810,594 A * | 3/1989 | Bregoli et al. | ................. | 429/13 |
| 4,816,106 A * | 3/1989 | Turris et al. | ................ | 156/285 |
| 5,328,542 A * | 7/1994 | Grasso et al. | ................ | 156/313 |
| 5,525,436 A | 6/1996 | Savinell et al. | ................ | 429/30 |
| 5,538,585 A * | 7/1996 | Wakita et al. | ............ | 156/308.2 |
| 5,770,172 A * | 6/1998 | Linehan et al. | ........... | 423/561.1 |
| 5,843,519 A | 12/1998 | Tada | | |
| 5,863,673 A * | 1/1999 | Campbell et al. | .............. | 429/44 |
| 6,127,059 A * | 10/2000 | Kato | ............................ | 429/40 |
| 6,187,468 B1 * | 2/2001 | Shinkai et al. | ................. | 429/42 |
| 6,524,736 B1 * | 2/2003 | Sompalli et al. | ............... | 429/42 |
| 6,627,035 B1 * | 2/2003 | Fan et al. | ................. | 156/308.2 |
| 6,605,381 B1 * | 8/2003 | Rosenmayer | ................. | 429/39 |
| 6,713,424 B1 * | 3/2004 | Stumper et al. | ............. | 502/101 |
| 6,716,551 B1 * | 4/2004 | Peinecke et al. | ............... | 429/39 |

(Continued)

FOREIGN PATENT DOCUMENTS

DE    195 44 323 A1    6/1997

(Continued)

*Primary Examiner*—J. A. Lorengo
*Assistant Examiner*—Patricia L. Hailey
(74) *Attorney, Agent, or Firm*—Lahive & Cockfield, LLP; Anthony A. Laurentano, Esq.

(57) ABSTRACT

A fuel cell provides a high output at a high current density. The fuel cell has an anode electrode and a cathode electrode comprising a gas diffusion layer, a water-repellent layer disposed on the gas diffusion layer and containing a carbon material and polytetrafluoroethylene, and an electrode catalyst layer disposed on the water-repellent layer and containing a carbon material carrying a catalyst. The electrode catalyst layer has maximum and minimum thicknesses that differ from each other by less than 30 μm. The electrode catalyst layer has cracks whose area is less than 10% of a total area of the electrode catalyst layer.

7 Claims, 10 Drawing Sheets

U.S. PATENT DOCUMENTS 6,723,464 B1 *  4/2004  Tabata et al. .................. 429/43
6,787,183 B1 *  9/2004  Iwasaki et al. ............. 427/115
6,855,178 B1 *  2/2005  Uchida et al. ............. 29/623.5

FOREIGN PATENT DOCUMENTS

JP          60-170168 A      9/1985

* cited by examiner

FIG. 5
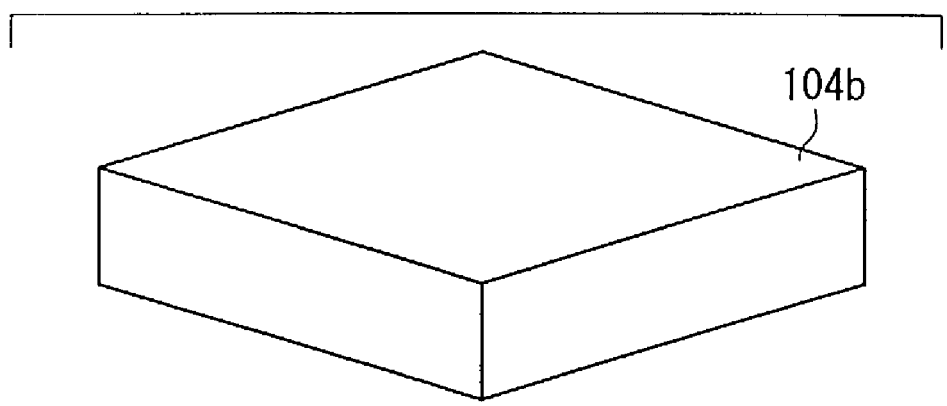
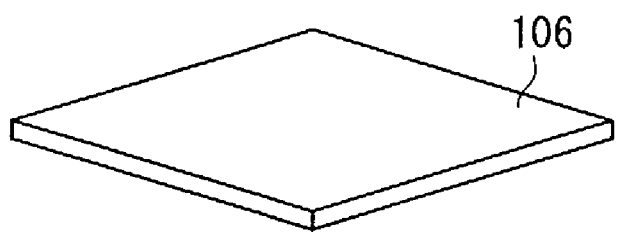
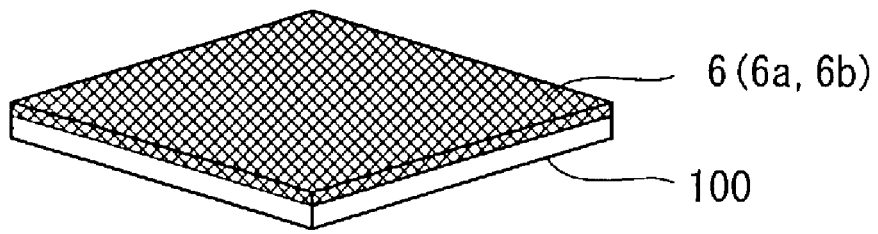
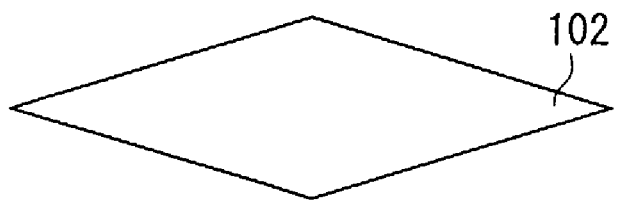
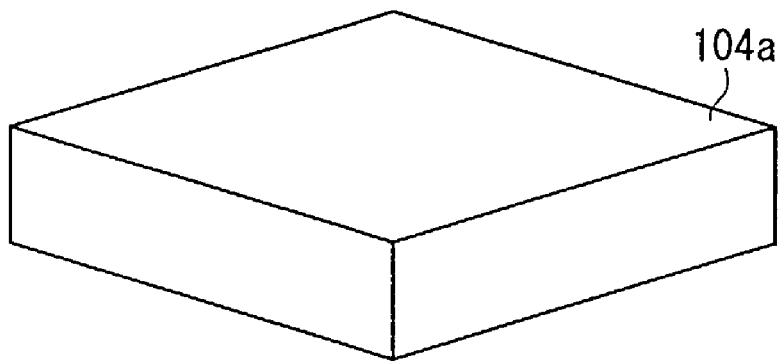

ELECTRODE FOR FUEL CELL, METHOD OF MANUFACTURING SAME, AND FUEL CELL WITH SUCH ELECTRODE

BACKGROUND OF THE INVENTION

1. Field of the Invention

The present invention relates to an electrode for a fuel cell which is capable of achieving a high output at a high current density, a method of manufacturing such an electrode, and a fuel cell having such an electrode.

2. Description of the Related Art

FIG. 9 of the accompanying drawings shows in vertical cross section a unit cell of a general phosphoric acid fuel cell which is one of presently available fuel cells. The unit cell, denoted at 1, has an electrolyte electrode assembly 5 which comprises an anode electrode 2, a cathode electrode 3, and an electrolyte 4 interposed between and joined to the electrodes 2, 3.

The electrolyte 4 comprises a polymer membrane made of a basic polymer such as polybenzimidazole and impregnated with a liquid electrolyte. See U.S. Pat. No. 5,525,436 for details. The liquid electrolyte may, for example, be phosphoric acid, sulfuric acid, methanesulfonic acid, or the like which conducts hydrogen ions.

As shown in FIG. 10 of the accompanying drawings, the anode electrode 2 and the cathode electrode 3 comprise respective gas diffusion layers 6a, 6b and respective electrode catalyst layers 7a, 7b coated uniformly on respective surfaces of the gas diffusion layers 6a, 6b. Generally, the gas diffusion layers 6a, 6b are made of carbon paper, carbon cloth, or the like, and the electrode catalyst layers 7a, 7b are made of a carbon black with a catalyst of Pt carried on its particle surface, or the like.

As shown in FIG. 9, the electrolyte electrode assembly is interposed between two separators 8a, 8b. The unit cell 1 also has collector electrodes 9a, 9b held against respective outer surfaces of the separators 8a, 8b, and end plates 10a, 10b held against respective outer surfaces of the collector electrodes 9a, 9b. The end plates 10a, 10b are connected to each other by bolts (not shown), sandwiching the electrolyte electrode assembly 5, the separators 8a, 8b, and the collector electrodes 9a, 9b between the end plates 10a, 10b. The separators 8a, 8b have respective gas passages 11a, 11b defined therein for supplying a hydrogen-containing gas and an oxygen-containing gas to the anode electrode 2 and the cathode electrode 3.

The anode electrode 2, the cathode electrode 3, and the electrolyte 4 are accommodated respectively in frame-shaped seals 12, 13, 14.

The general phosphoric acid fuel cell comprises a stack (not shown) of unit cells 1 that are electrically connected in series, a mechanism for supplying a hydrogen-containing gas to and discharging a hydrogen-containing gas from the stack, and a mechanism for supplying an oxygen-containing gas to and discharging an oxygen-containing gas from the stack.

For operating the phosphoric acid fuel cell, a fuel gas such as a hydrogen-containing gas or the like is supplied via the gas passages 11a in the separator 8a to the anode electrode 2 of each unit cell 1, whereas an oxygen-containing gas such as air or the like is supplied via the gas passages 11b in the separator 8b to the cathode electrode 3. The fuel gas and the oxygen-containing gas pass through the respective gas diffusion layers 6a, 6b of the electrodes 2, 3 and then reach the respective electrode catalyst layers 7a, 7b. In the electrode catalyst layer 7a of the anode electrode 2, the hydrogen in the fuel gas causes a reaction represented by the following formula (A), generating hydrogen ions and electrons:

$$2H_2 \rightarrow 4H^+ + 4e \quad (A)$$

The generated hydrogen ions move through the electrolyte 4 to the cathode electrode 3. During this time, the electrons flow to an external circuit that is electrically connected to the anode electrode 2 and the cathode electrode 3, are used as an electric energy in the form of a direct current to energize the external circuit, and then flow to the cathode electrode 3.

The hydrogen ions that have moved to the cathode electrode 3 and the electrons that have moved to the cathode electrode 3 via the external circuit react with the oxygen contained in the oxygen-containing gas supplied to the cathode electrode 3, as indicated by the following formula (B):

$$O_2 + 4H^+ + 4e \rightarrow 2H_2O \quad (B)$$

The fuel gas which remains unreacted is discharged out of the unit cell 1 (fuel cell) through the gas passages 11a in the separator 8a. Similarly, the oxygen-containing gas which remains unreacted and the generated $H_2O$ are discharged out of the unit cell 1 through the gas passages 11b in the separator 8b.

If the voltage across the unit cell 1 is represented by V, the density of the current generated by the unit cell 1 by I, and the effective area of the electrodes 2, 3 by S, then the output P of the unit cell 1 is determined according to the following equation (C):

$$P = I \times V \times S \quad (C)$$

In the fuel cell, as the current density I increases, the cell voltage V drops, and finally the output P of the unit cell 1 drops, as can be seen from the equation (C). Specifically, when the fuel cell generates electricity at a large current density, the voltage across the fuel cell drops below a desired level, failing to sufficiently energize the load connected to the fuel cell. For this reason, there has been a demand for a unit cell whose voltage drop is lower even when it generates electricity at a large current density, i.e., whose output is large at a large current density.

While the cell voltage V across the unit cell 1 varies depending on the current density I, the cell voltage V is generally about 1 V. If a higher cell output is needed to provide a power supply for a motor on an automobile, for example, then it is necessary to connect a number of unit cells 1 in series. However, the resulting fuel cell increases in weight and size, requiring a large installation space on the automobile. The automobile with the fuel cell carried thereon also becomes heavy. To avoid these shortcomings, there has been a demand for a unit cell with a higher output.

For increasing the cell voltage V at the time the unit cell is discharged at a high current density, it is necessary to reduce the internal resistance of the unit cell 1.

As can be understood from the formula (B), $H_2O$ is generated during operation of the fuel cell. The amount M (mol/min.) of $H_2O$ generated per unit time is determined from the current density I ($A/cm^2$) and the effective electrode area S ($cm^2$) according to the following equation (D):

$$M = I \times S \times 60 / (96500 \times 2) \quad (D)$$

Thus, the amount M of $H_2O$ generated per unit time increases as the current density I increases. In continued operation of the fuel cell under this condition, when the generated $H_2O$ is discharged, the liquid electrolyte of phosphoric acid or the like seeps from the composite electrolyte 4, tending to clog the interstices of the gas diffusion layer 6b (carbon paper or the like). When the interstices of the gas diffusion layer 6b clogged, it is difficult for the supplied oxygen-containing gas to be diffused to the electrode catalyst layer 7b, making it difficult for the reaction represented by the formula (B) to take place. Stated otherwise, since the reaction efficiency of the reaction represented by the formula (B) is lowered, the cell voltage of the unit cell drops.

Japanese laid-open patent publication No. 60-170168 proposes a water-repellent layer interposed between a gas diffusion layer and an electrode catalytic layer for repelling a liquid electrolyte to prevent the liquid electrolyte from seeping from an electrolyte.

The water-repellent layer is produced by coating a gas diffusion layer of carbon paper or the like with a solution which has been prepared by dissolving a porous carbon material and PTFE (polytetrafluoroethylene) in a solvent such as water, isopropyl alcohol, or the like, and heating the coated gas diffusion layer preferably at a temperature ranging from 350 to 400° C. to harden the coated solution.

However, the water-repellent layer thus produced tends to crack easily to the extent that the produced cracks usually reach about 5%, or about 15% at maximum, of the total area of the water-repellent layer. The water-repellent layer itself may suffer surface irregularities and have maximum and minimum thicknesses that differ from each other by at least 60 μm. When the coated gas diffusion layer is heated in the above temperature range, the water-repellent layer becomes too water-repellent to allow an electrode catalyst layer paste to be easily coated on the gas diffusion layer. An electrode catalyst layer somehow coated on the gas diffusion layer also tends to crack and suffer surface irregularities. The cracks in the electrode catalyst layer usually reach about 10%, or about 30% at maximum, of the total area of the electrode catalyst layer. The electrode catalyst layer with surface irregularities has maximum and minimum thicknesses that differ from each other by about 50 μm.

The crack in the electrode catalyst layer obstructs electric conduction in the electrode catalyst layer. The electrode catalyst layer with the surface irregularities suffer an irregular charge distribution. At any rate, the electric conductivity of the electrodes is lowered, resulting in an increase in the internal resistance of the fuel cell.

As described above, when the fuel cell is operated to generate electricity at a high current density, the liquid electrolyte seeps from the composite electrolyte. The water-repellent layer added to prevent the liquid electrolyte from seeping from the composite electrolyte invites an increase in the internal resistance of the fuel cell. Consequently, it is highly difficult to construct a fuel cell which is capable of achieving a high output at a high current density.

SUMMARY OF THE INVENTION

It is therefore an object of the present invention to provide an electrode for a fuel cell which has a high electric conductivity and a substantially uniform charge distribution and which is capable of achieving a high output at a high current density, a method of manufacturing such an electrode, and a fuel cell having such an electrode.

To achieve the above object, there is provided in accordance with the present invention an electrode for use as an anode electrode or a cathode electrode in a fuel cell, comprising a gas diffusion layer, a water-repellent layer disposed on the gas diffusion layer and containing a carbon material and polytetrafluoroethylene, and an electrode catalyst layer disposed on the water-repellent layer and containing a carbon material carrying a catalyst, the electrode catalyst layer having maximum and minimum thicknesses that differ from each other by less than 30 μm, the electrode catalyst layer having cracks whose area is less than 10% of a total area of the electrode catalyst layer.

In the electrode having the water-repellent layer, the water-repellent layer repels water. Therefore, even if a large amount of $H_2O$ is produced when the fuel cell is operated to generate electricity at a high current density, a liquid electrolyte is prevented from seeping from a composite electrolyte.

The electrode catalyst layer with small surface irregularities, i.e., small differences between maximum and minimum thicknesses has a substantially uniform charge distribution. The electrode catalyst layer with a small amount of cracking has its electric conduction obstructed to a small extent. Therefore, the electrode catalyst layer has a good electric conductivity. Since the internal resistance of a unit cell and hence the fuel cell is lowered, the fuel cell can produce a high output even when it is operated to generate electricity at a high current density.

Preferably, the water-repellent layer has maximum and minimum thicknesses that differ from each other by less than 40 μm, and the water-repellent layer has cracks whose area is less than 5% of a total area of the water-repellent layer. The electrode catalyst layer disposed on the water-repellent layer has cracks and surface irregularities that are reliably kept within the above ranges.

The polytetrafluoroethylene contained in the water-repellent layer preferably has a composition ratio ranging from 10 to 40 weight %. If the composition ratio of the PTFE were less than 10 weight %, then the water-repellent layers would not be water-repellent enough to prevent the liquid electrolyte from seeping from the composite electrolyte. If the composition ratio of the PTFE were greater than 40 weight %, then the water-repellent layers would be too water-repellent to coat an electrode catalyst layer paste easily thereon. As a result, the bonding strength between the water-repellent layer and the electrode catalyst layer would not be sufficient.

The electrode catalyst layer preferably also contains polytetrafluoroethylene. Since the electrode catalyst layer is made water-repellent, the ability to prevent the liquid electrode from seeping out is further increased.

A fuel cell according to the present invention has the above electrode as either one of anode and cathode electrodes. Since the fuel cell has the electrode constructed as described above, the fuel cell can produce a high output even when it is operated to generate electricity at a high current density.

According to the present invention, there is also provided a method of manufacturing an electrode for use in a fuel cell, comprising the steps of (a) coating a first paste containing a carbon material and polytetrafluoroethylene on a base which will serve as a gas diffusion layer, (b) pressurizing and drying the coated first paste into a water-repellent layer, (c) coating a second paste containing a carbon material carrying a catalyst on the water-repellent layer, (d) pressurizing and drying the coated second paste into an electrode catalyst layer, and (e) carrying out the step (d) while the base is being interposed between a porous sheet and a polymer sheet covering the second paste.

When the step (d) is carried out as described above, it is possible to form an electrode catalyst layer that suffers a small amount of cracking and small surface irregularities.

Preferably, the step (b) is carried out while the base is being interposed between a porous sheet and a polymer sheet covering the first paste. The water-repellent layer thus formed suffers a small amount of cracking and small surface irregularities. When the second paste is coated on the water-repellent layer and dried, it is possible to reliably form an electrode catalyst layer that suffers a small amount of cracking and small surface irregularities.

To more reliably form an electrode catalyst layer that suffers a small amount of cracking and small surface irregularities, it is preferable to coat and dry the second paste in at least one cycle between the step (c) and the step (d). For the same reason, the first paste is preferably coated and dried in at least one cycle between the step (a) and the step (b).

A slight amount of solvent may remain in the water-repellent layer thus formed. It is preferable to further heat the assembly for volatilizing away the remaining amount of solvent. The assembly is preferably heated in order to increase the water repellency of the water-repellent layer and the bonding strength between the water-repellent layer and the base.

Temperatures that are suited to the above purposes are usually different from each other. Preferably, the assembly should be heated at different temperatures after the step (b). If the temperature suitable for the removal of the solvent by way of volatilization and the temperature suitable for increasing the water repellency of the water-repellent layer and the bonding strength between the water-repellent layer and the base are the same as each other, then the assembly may be heated in one cycle.

For the same reason, the assembly should preferably be heated to remove the solvent remaining in the electrode catalyst layer after the step (d).

To impart an appropriate level of water repellency to the water-repellent layer, the water-repellent layer preferably contains polytetrafluoroethylene in a range from 10 to 40 weight %.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is an exploded perspective view, partly omitted from illustration, showing the manner in which a water-repellent layer of an electrode in the fuel cell shown in FIG. 2 is produced;

DESCRIPTION OF THE PREFERRED EMBODIMENT

Figure 9:
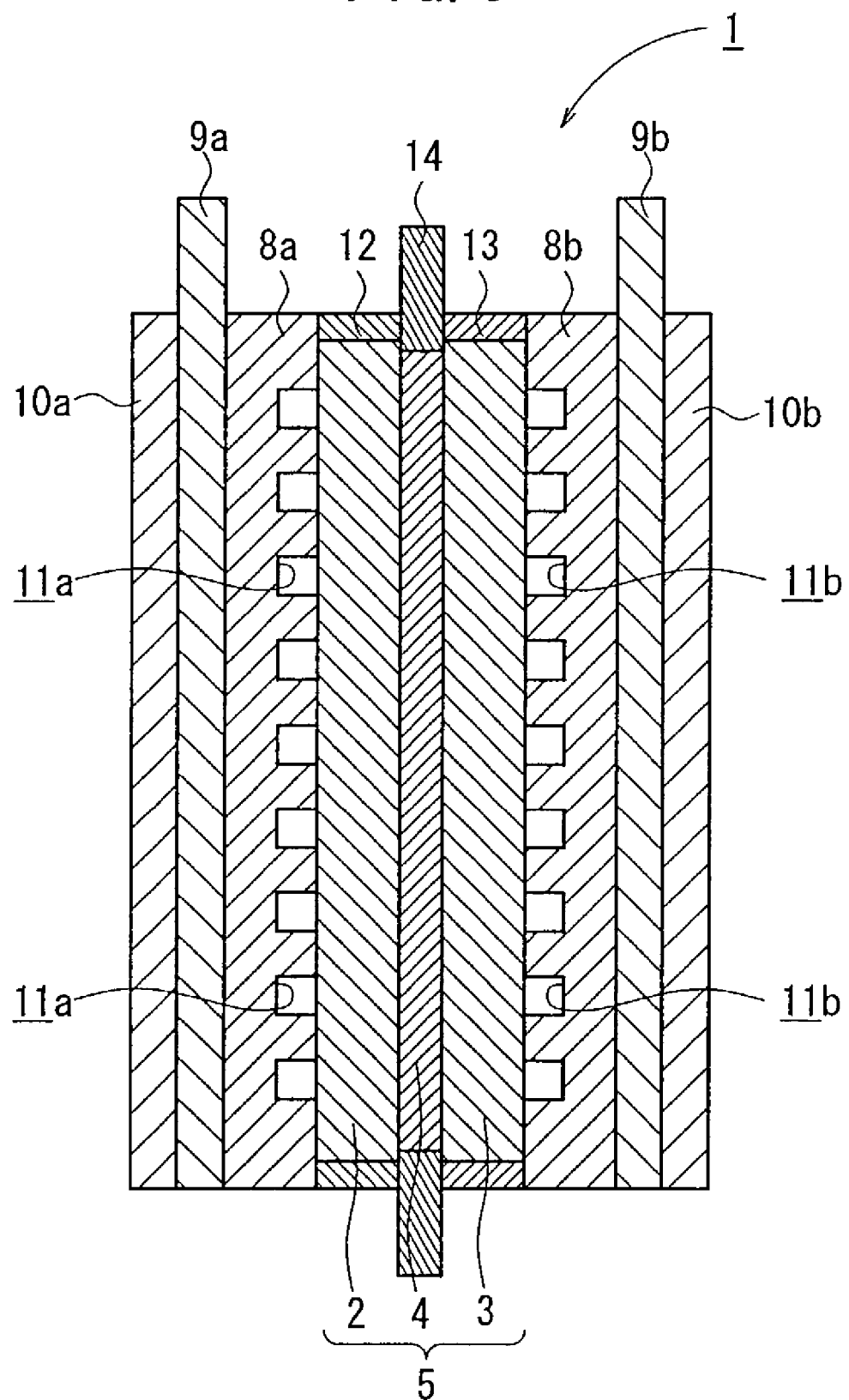
FIG. 9 is a vertical cross-sectional view of a unit cell of a conventional fuel cell.
Figure 10:
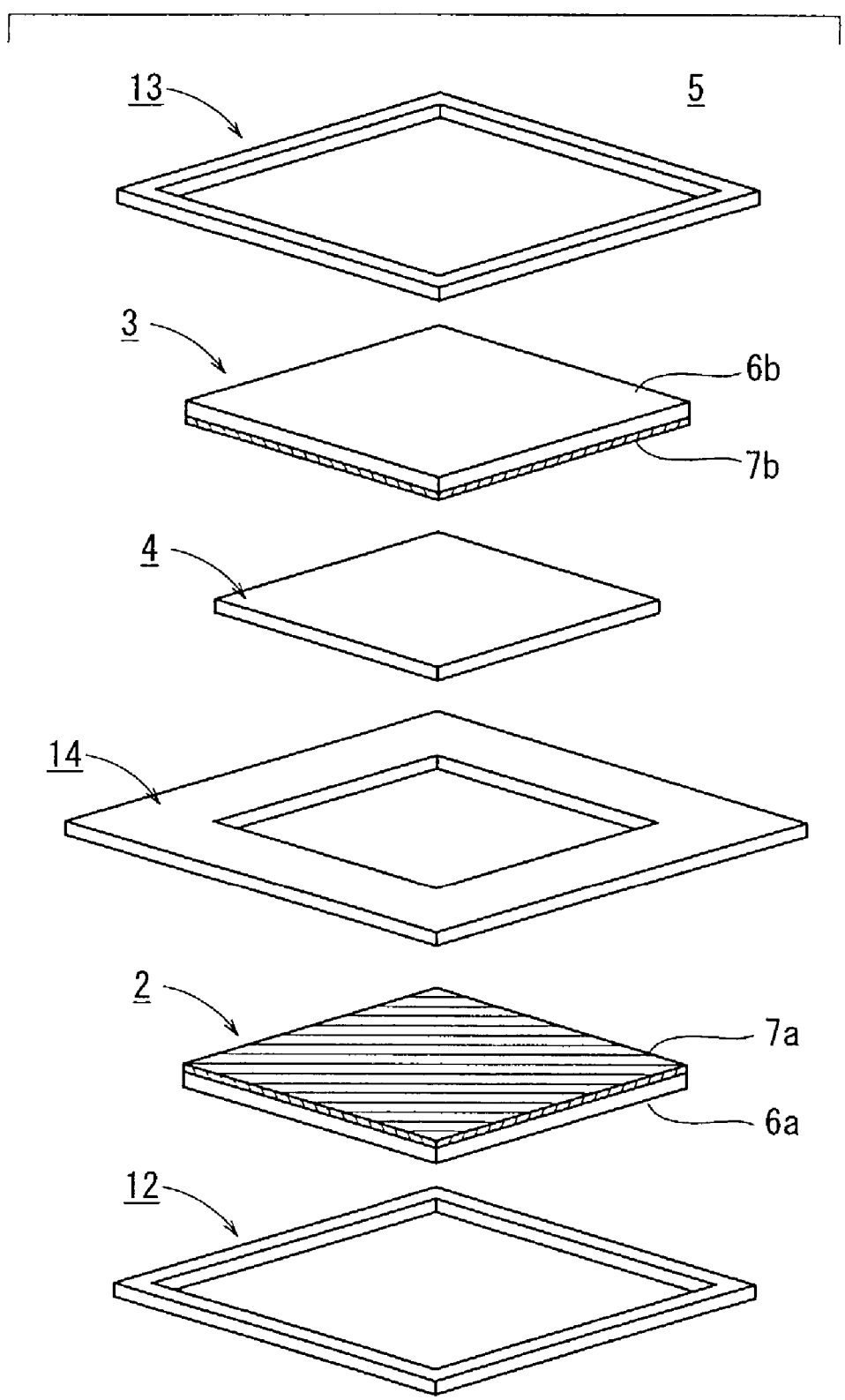
FIG. 10 is an exploded perspective view of an electrolyte electrode assembly of the fuel cell shown in FIG. 9.

An electrode for a fuel cell according to the present invention and a method of manufacturing such an electrode will be described in detail below with reference to the accompanying drawings which show a fuel cell incorporating such an electrode. Those parts of the fuel cell according to the present invention which are identical to those of the fuel cell shown in FIGS. 9 and 10 are denoted by identical reference characters, and will not be described in detail below.

Figure 1:
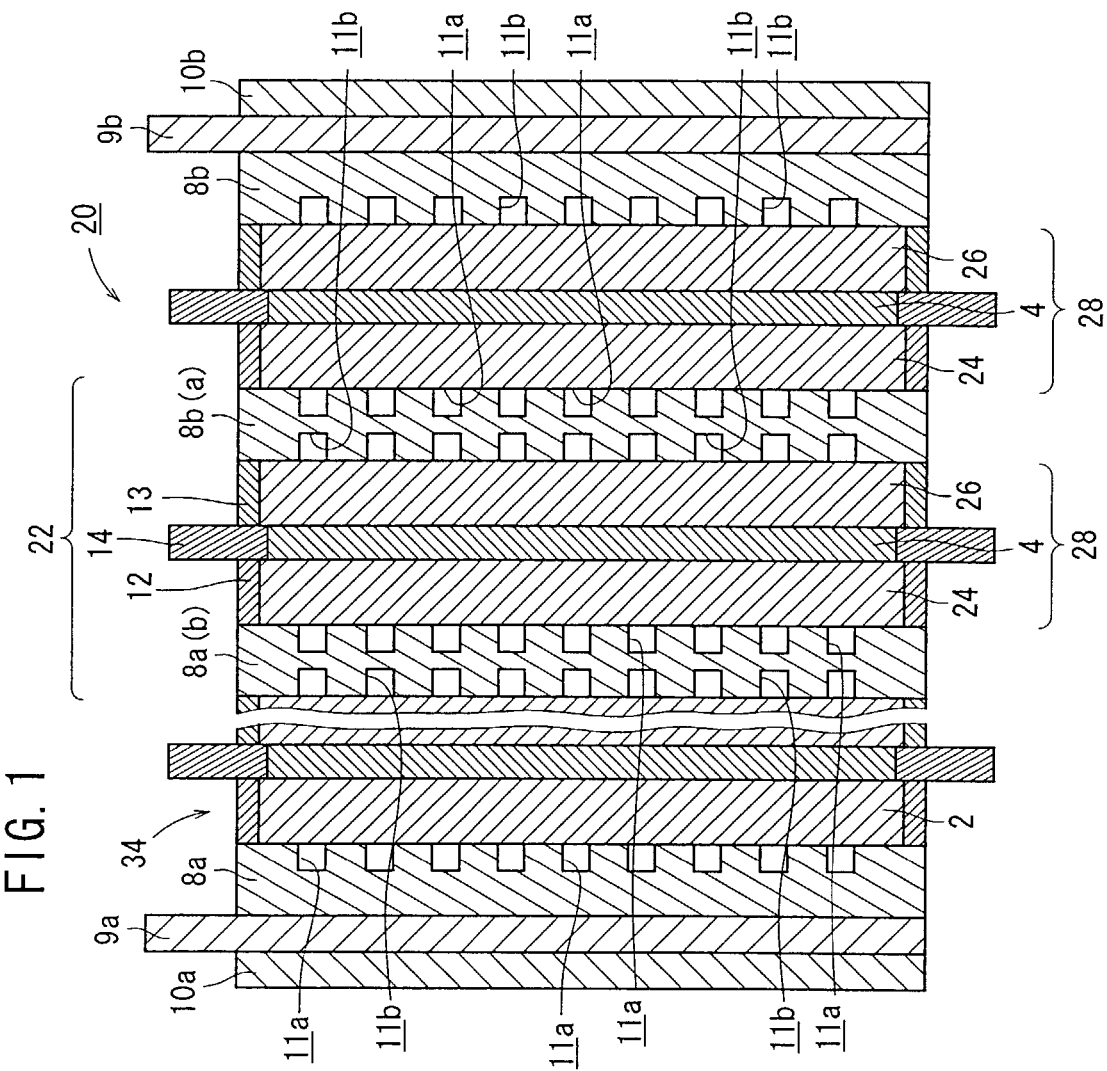
FIG. 1 is a vertical cross-sectional view of a fuel cell according to the present invention.

A fuel cell which incorporates an electrode according to the present invention is illustrated in vertical cross section in FIG. 1. The fuel cell, denoted at 20, has a plurality of unit cells 22 that are assembled together. Each of the unit cells 22 has an electrolyte electrode assembly 28 comprising an anode electrode 24, a cathode electrode 26, and a composite electrolyte 4 interposed between the anode electrode 24 and the cathode electrode 26. The anode electrode 24, the cathode electrode 26, and the composite electrolyte 4 are joined together.

Figure 2:
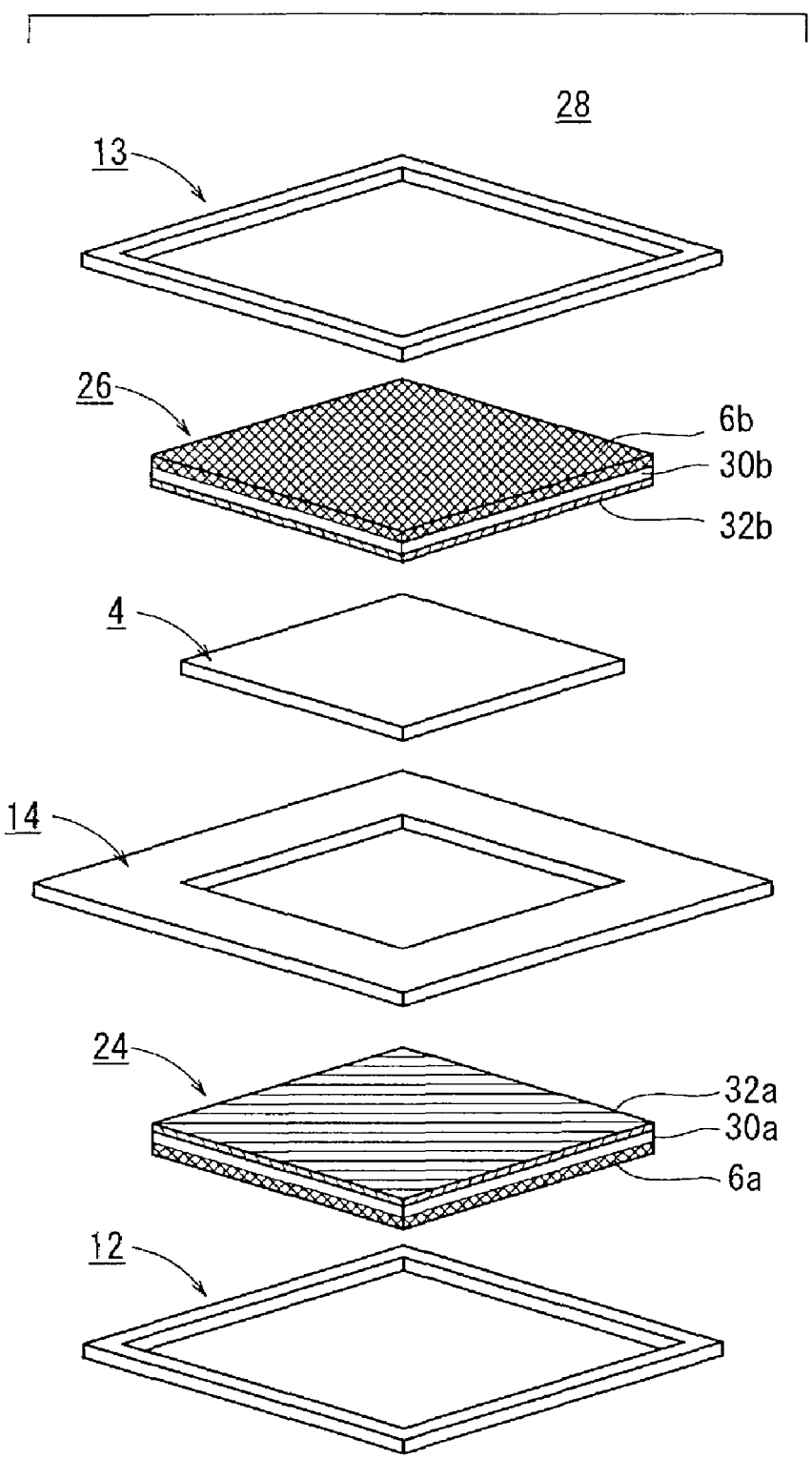
FIG. 2 is an exploded perspective view of an electrolyte electrode assembly of the fuel cell shown in FIG. 1.

As shown in FIG. 2, the anode electrode 24 and the cathode electrode 26 comprise respective gas diffusion layers 6a, 6b, respective water-repellent layers 30a, 30b, and respective electrode catalyst layers 32a, 32b which are laminated in the order named. The water-repellent layers 30a, 30b are interposed between the gas diffusion layers 6a, 6b and the electrode catalyst layers 32a, 32b.

The gas diffusion layers 6a, 6b are made of carbon paper, and the electrode catalyst layers 32a, 32b are made of a carbon black with a catalyst of Pt carried on its particle surface and PTFE. The water-repellent layers 30a, 30b are made of a carbon black and PTFE. Both the carbon black and the PTFE are water-repellent to prevent a phosphoric acid from seeping from the composite electrolyte 4. The PTFE has excellent water repellency. Since the PTFE is inexpensive, it allow the water-repellent layers 30a, 30b to be included at a low cost.

The composition ratio of the PTFE in the water-repellent layers 30a, 30b is preferably in the range from 10 to 40 weight %. If the composition ratio of the PTFE were less than 10 weight %, then the water-repellent layers 30a, 30b would not be water-repellent enough to prevent a liquid electrolyte from seeping from the composite electrolyte 4. If the composition ratio of the PTFE were greater than 40 weight %, then the water-repellent layers 30a, 30b would be too water-repellent to coat an electrode catalyst layer paste easily thereon.

The water-repellent layers 30a, 30b suffer a small amount of cracking and small surface irregularities. Specifically, the cracks of the water-repellent layers 30a, 30b usually reach about 0.3 to 2%, or about less than 5% at maximum, of the total area of the water-repellent layers 30a, 30b. The water-repellent layers 30a, 30b with surface irregularities have maximum and minimum thicknesses that differ from each other by usually 30 μm or less than 40 μm at maximum.

Since the electrode catalyst layers 32a, 32b are disposed on the water-repellent layers 30a, 30b which have a small amount of cracking and small surface irregularities, the electrode catalyst layers 32a, 32b also suffer a small amount of cracking and small surface irregularities. Specifically, the cracks of the electrode catalyst layers 32a, 32b usually reach about 2 to 7%, or about less than 10% at maximum, of the total area of the electrode catalyst layers 32a, 32b. The electrode catalyst layers 32a, 32b with surface irregularities have maximum and minimum thicknesses that differ from each other by usually 20 μm or less than 30 μm at maximum.

Consequently, in the anode electrode 24 and the cathode electrode 6 (an electrode for a fuel cell), the amount of cracking present in the electrode catalyst layers 32a, 32b is small. Because the electric conduction in the electrode catalyst layers 32a, 32b is obstructed to a small degree by the cracks therein, the electric conductivity of the electrode catalyst layers 32a, 32b is relatively large. Furthermore, inasmuch as the difference between the maximum and minimum thicknesses of the electrode catalyst layers 32a, 32b is very small, the electrode catalyst layers 32a, 32b have a substantially uniform charge distribution. For these reasons, the unit cells 22 and hence the fuel cell 20 have a low internal resistance to allow the fuel cell 20 to produce a high output when it generates electricity at a high current density.

In the electrolyte electrode assembly 28, the composite electrolyte 4 interposed between the electrodes 24, 26 comprises a matrix impregnated with phosphoric acid, sulfuric acid, methylsulfonic acid, or the like which functions as a hydrogen ion conductor. The matrix is a material capable of retaining a liquid electrolyte therein. The matrix may comprise porous silicon carbide or the like. However, the matrix should preferably be made of a basic polymer having a monomer of secondary amine as a structural unit because it has an excellent ability to retain a liquid electrolyte, a low gas permeability, and is highly strong. Examples of the basic polymer are represented by the following formulas (1) through (4):

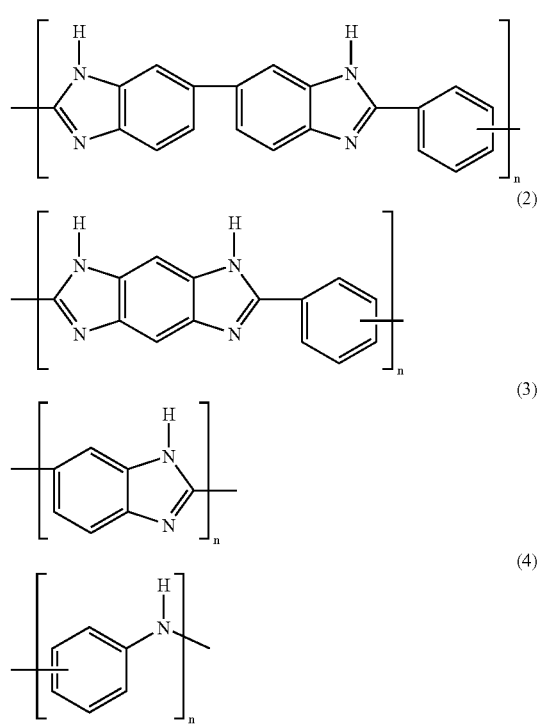

In particular, the polybenzimidazole represented by the formula (1) is preferable because it has an excellent ability to retain a liquid electrolyte, a low gas permeability, and is highly strong. The composite electrolyte 4 can be prepared by dipping the basic polymer in the liquid electrolyte, thereby impregnating the basic polymer with the liquid electrolyte.

The composite electrolyte 4 is sandwiched between the anode electrode 24 and the cathode electrode 26. The assembly is then pressurized and heated to join the electrodes 24, 26 to the composite electrolyte 4, thus producing the electrolyte electrode assembly 28.

The electrolyte electrode assembly 28 is then interposed between two separators 8a, 8b, producing the unit cell 22. A predetermined number of unit cells 22 are then stacked and electrically connected in series, providing a stacked assembly 34 (see FIG. 1). Collector electrodes 9a, 9b are electrically connected respectively to the separator 8a held against the anode electrode 24 of the unit cell 22 on one end of the stacked assembly 34 and the separator 8b held against the cathode electrode 26 of the unit cell 22 on the other end of the stacked assembly 34. Then, end plates 10a, 10b are attached respectively to outer sides of the collector electrodes 9a, 9b, thereby completing the fuel cell 20. The end plates 10a, 10b are connected to each other by bolts (not shown).

The separators 8a, 8b have respective gas passages 11a, 11b defined therein for supplying a hydrogen-containing gas and an oxygen-containing gas to the anode electrode 24 and the cathode electrode 26, and also discharging an unreacted gas out of the fuel cell 20.

The anode electrode 24, the cathode electrode 26, and the composite electrolyte 4 are accommodated respectively in frame-shaped seals 12, 13, 14.

Figure 3:
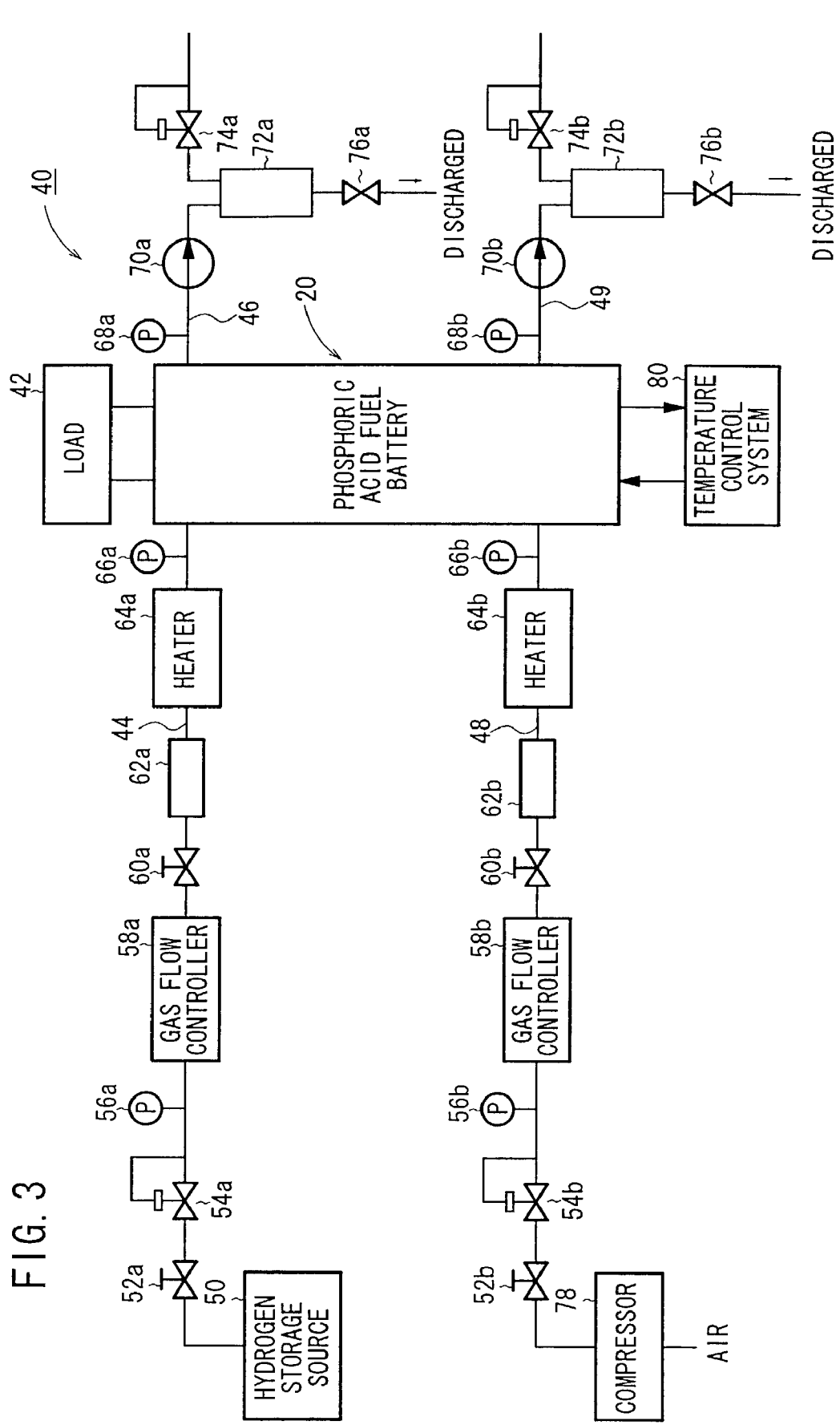
FIG. 3 is a block diagram of a fuel cell system which incorporates the fuel cell shown in FIG. 1 and peripheral devices.

A fuel cell system 40 which incorporates the fuel cell 20 is shown in block form in FIG. 3. A load 42 such as a motor or the like is electrically connected to the collector electrodes 9a, 9b (see FIG. 1) of the fuel cell 20. To the fuel cell 20, there are connected a hydrogen-containing gas supply passage 44 (see FIG. 3) and a hydrogen-containing gas discharge passage 46 which are held in communication with the gas passages 11a in each of the unit cells 22 of the stacked assembly 34, and an oxygen-containing gas supply passage 48 and an oxygen-containing gas discharge passage 49 which are held in communication with the gas passages 11b in each of the unit cells 22 of the stacked assembly 34.

To the hydrogen-containing gas supply passage 44, there are connected a hydrogen storage source 50 for supplying the hydrogen-containing gas under a high pressure, a solenoid-operated valve 52a, a pressure reducing valve 54a, a pressure sensor 56a, a gas flow controller 58a, a shutoff valve 60a, a check valve 62a, a heater 64a, and an inlet pressure sensor 66a successively in the order named in a direction toward an inlet of the fuel cell 20. To the hydrogen-containing gas discharge passage 46, there are connected an outlet pressure sensor 68a, a heat exchanger 70a, a gas-liquid separator 72a, and a back pressure valve 74a successively in the order named in a direction away from an outlet of the fuel cell 20. A solenoid-operated valve 76a is connected to an outlet of the gas-liquid separator 72a.

The oxygen-containing gas supply passage 48 and the oxygen-containing gas discharge passage 49 are of a structure identical to the hydrogen-containing gas supply passage 44 and the hydrogen-containing gas discharge passage 46. Those parts connected to the oxygen-containing gas supply passage 48 and the oxygen-containing gas discharge passage 49 which are identical to those connected to the hydrogen-containing gas supply passage 44 and the hydrogen-containing gas discharge passage 46 are denoted by identical reference numerals with a suffix "b", and will not be described in detail below. A compressor 78 for supplying air as the oxygen-containing gas is connected to an upstream end of the oxygen-containing gas supply passage 48.

The operating temperature of the fuel cell 20 in the fuel cell system 40 is controlled by a temperature control system 80.

The fuel cell system 40 operates as follows:

The hydrogen storage source 50 supplies the hydrogen-containing gas under a high pressure to the hydrogen-containing gas supply passage 44. The hydrogen-containing gas is then adjusted to a given pressure, a given rate, and a given temperature while flowing through the pressure-reducing valve 54a, the gas flow controller 58a, and the heater 64a. Thereafter, the hydrogen-containing gas is supplied via the gas passages 11a in the separator 8a in each unit cell 22 (see FIG. 1) of the fuel cell 20 to the gas diffusion layer 6a (see FIG. 2) of the anode electrode 24 in each unit cell 22, from which the hydrogen-containing gas reaches the electrode catalyst layer 32a via the water-repellent layer 30a.

The compressor 78 supplies the oxygen-containing gas such as air to the oxygen-containing gas supply passage 48. The oxygen-containing gas is then adjusted to a given pressure, a given rate, and a given temperature while flowing through the pressure-reducing valve 54b, the gas flow controller 58b, and the heater 64b. Thereafter, the oxygen-containing gas is supplied via the gas passages 11b in the separator 8b in each unit cell 22 (see FIG. 1) of the fuel cell 20 to the gas diffusion layer 6b (see FIG. 2) of the cathode electrode 26 in each unit cell 22, from which the oxygen-containing gas reaches the electrode catalyst layer 32b via the water-repellent layer 30b.

The hydrogen-containing gas or the oxygen-containing gas which has passed through the gas passages 11a, 11b without being supplied to the anode electrode 24 (see FIG. 1) or the cathode electrode 26 flows from the heat exchanger 70a, 70b to the gas-liquid separator 72a, 72b connected to the hydrogen-containing gas discharge passage 46 (see FIG. 3) or the oxygen-containing gas discharge passage 49. The gas-liquid separator 72a, 72b separates the supplied gas into a gas component and a liquid component.

The hydrogen-containing gas and the oxygen-containing gas which are supplied to the anode electrode 24 and the cathode electrode 26, respectively, are greatly inhibited from passing through the composite electrolyte 4 because the gas permeability of the basic polymer of the composite electrolyte 4 is low. Therefore, the hydrogen in the hydrogen-containing gas is prevented from directly reacting with the oxygen in the oxygen-containing gas, so that the energy conversion efficiency of the fuel cell 20 (see FIG. 1) in the fuel cell system 40 (see FIG. 3) is increased.

Specifically, the hydrogen is electrolytically dissociated highly efficiently by the electrode catalyst layer 32a (see FIG. 2) of the anode electrode 24 as indicated by the formula (A), generating a large amount of hydrogen ions and electrons. The electrons provide an electric energy for energizing the load 42 such as a motor which is electrically connected to the fuel cell system 40 (see FIG. 3).

The hydrogen ions pass through the composite electrolyte 4 (see FIGS. 1 and 2) to the electrode catalyst layer 32b (see FIG. 2) of the cathode electrode 26. In the electrode catalyst layer 32b, the hydrogen ions, the electrons that have reached the cathode electrode 26 through the load 42, and the oxygen in the oxygen-containing gas that has been supplied to the cathode electrode 26 and has passed through the gas diffusion layer 6b of the cathode electrode 26 cause the chemical reaction represented by the formula (B), generating $H_2O$.

When the fuel cell system 40 is operated to generate electricity at a high current density, the amount of generated $H_2O$ is large as indicated by the formula (C). The generated $H_2O$ is quickly repelled by the PTFE contained in the electrode catalyst layer 32b and the water-repellent layer 30b, and led through the electrode catalyst layer 32b, the water-repellent layer 30b, and the gas diffusion layer 6b to the gas passages 11b. The $H_2O$ is finally condensed by the heat exchanger 70b connected to the oxygen-containing gas discharge passage 49, and then separated from an unreacted oxygen-containing gas by the gas-liquid separator 72b. Therefore, the liquid electrolyte is highly prevented from seeping from the matrix of the composite electrolyte 4, thus reducing a drop of the cell voltage V of the unit cell 22 (see FIG. 1).

If the matrix is made of a basic polymer as described above, since the basic polymer and the acid liquid electrolyte (phosphoric acid, sulfuric acid, methanesulfonic acid, or the like) are strongly attracted to each other, the liquid electrolyte is unlikely to seep from the basic polymer. Therefore, a drop of the cell voltage V of the unit cell 22 is further reduced.

As described above, the electrode catalyst layers 32a, 32b of the anode and cathode electrodes 24, 26 (see FIGS. 1 and 2) have a small amount of cracking and small surface irregularities. Thus, the electrode catalyst layers 32a, 32b have a good electric conductivity and a good charge distribution, reducing the internal resistance of the unit cell 22 and hence the fuel cell 20. Therefore, the fuel cell 20 can achieve a high output when it is operated to generate electricity at a high current density.

Briefly summarized, since the fuel cell 20 uses the anode and cathode electrodes 24, 26 with water-repellent layers 30a, 30b interposed between the gas diffusion layers 6a, 6b and the electrode catalyst layers 32a, 32b, the liquid electrolyte is prevented from seeping from the composite electrolyte 4. As a result, the gas diffusion layers 6a, 6b are prevented from being clogged by the liquid electrolyte which would otherwise seep from the composite electrolyte 4, so that passages are maintained for the hydrogen-containing gas and the oxygen-containing gas. Furthermore, inasmuch as the electrode catalyst layers 32a, 32b have a small amount of cracking and small surface irregularities, the internal resistance of the fuel cell 20 is lowered. Consequently, even when the fuel cell 20 is operated to generate electricity at a high current density, the cell voltage V is kept at a high level, increasing the output P of the fuel cell 20.

Stated otherwise, the fuel cell 20 can produce a high output even if the number of unit cells 22 thereof is small. Therefore, the fuel cell 20 can be reduced in size and weight, and yet can energize the load sufficiently. The fuel cell 20 can be mounted in a reduced installation space on an automobile, and the weight of the automobile on which the fuel cell 20 is mounted is not increased.

A method of manufacturing the anode electrode 24 and the cathode electrode 26 (an electrode for a fuel cell) will be described below.

Figure 4:
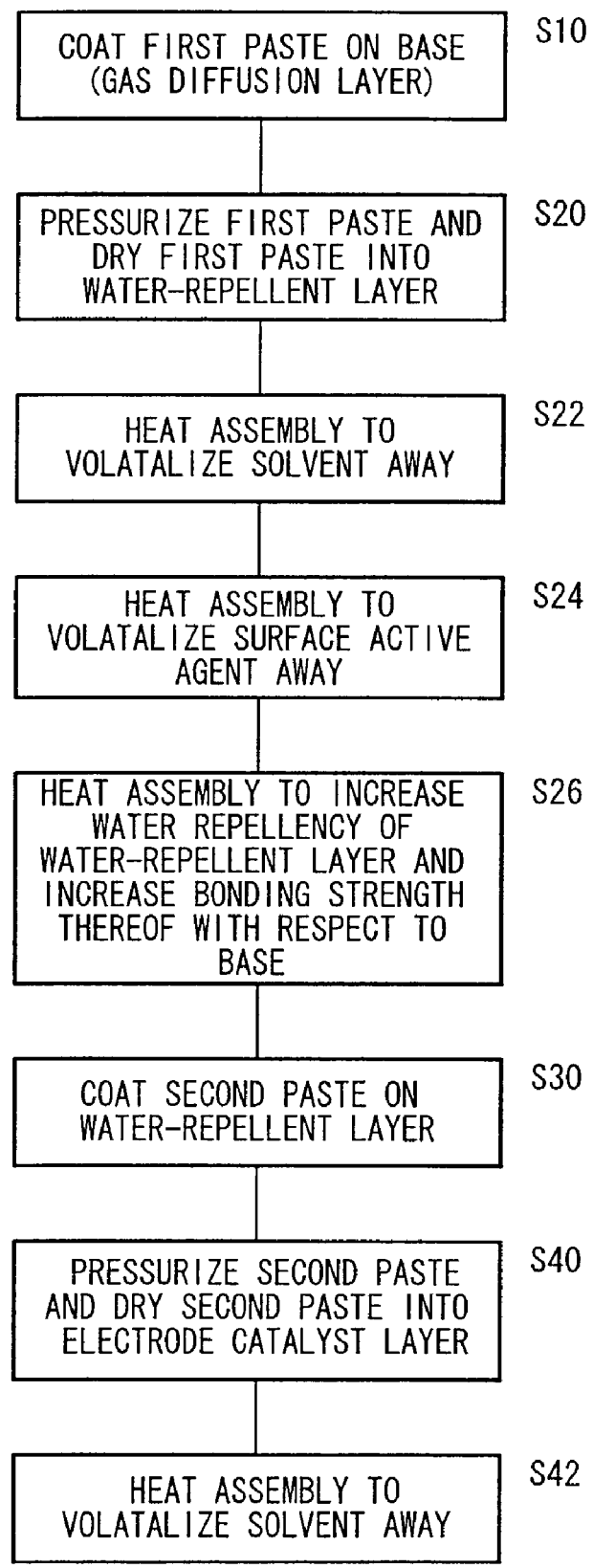
FIG. 4 is a flowchart of a method of manufacturing an electrode for a fuel cell according to the present invention.

The method of manufacturing an electrode for a fuel cell is shown in FIG. 4. The method basically has first step S10 of coating a first paste on a base which will serve as a gas diffusion layer, second step S20 of drying the first paste under pressure to form a water-repellent layer, third step S30 of coating a second paste on the water-repellent layer, and fourth step S40 of drying the second paste under pressure to form an electrode catalyst layer.

In first step S10, a base 6 made of carbon paper, carbon cloth, or the like shown in FIG. 5 is coated with a first paste 100. The first paste 100 may be coated according to any of various coating processes. However, the first paste 100 should preferably be coated according to a screen printing process because the coated paste has small thickness differences due to surface irregularities. The first paste 100 may be prepared by dispersing particles of a carbon material such as carbon black and particles of PTFE, together with a surface active agent, in a mixed solvent of pure water and ethylene glycol or the like. The amount of PTFE particles should preferably be selected such that the composition ration of PTFE in the dried first paste is in the range from 10 to 40 weight %.

The first paste 100 may be coated to a predetermined thickness in one coating process, but should preferably be coated in repeated coating and drying cycles because those repeated cycles allow the coated first paste 100 to have reduced thickness differences due to surface irregularities. When the first paste 100 is dried, it is not necessary to pressurize the first paste 100 and the base 6.

After the first paste 100 is coated to a predetermined thickness on the base 6, the first paste 100 is dried while it is being pressurized, as follows:

First, the first paste 100 coated on the base 6 is covered with a polymer film 102 made of PTFE, polyethylene terephthalate, polyimide, or the like, which is resistant to heat and has smooth end faces. Then, as shown in FIG. 5, the assembly is placed on a lower press plate 104a of a press (not shown) with the polymer film 102 being positioned downwardly, and a porous sheet 106 is placed on the base 6.

The porous sheet 106 may be a sheet capable of trapping a vapor that is generated upon volatilization of the mixed solvent and the surface active agent contained in the first paste 100 when the first paste 100 is dried. Specifically, the porous sheet 106 may be made of woven or nonwoven fabric of polypropylene or the like or cotton paper or the like.

The base 6 and the first paste 100 are heated while being pressurized by the lower press plate 104a and an upper press plate 104b. The base 6 and the first paste 100 are heated and pressurized under a load at a temperature for a period of time which are not uniquely determined, but selected depending on the type of the solvent and the amount of the first paste 100 to be dried.

When the base 6 and the first paste 100 are heated and pressurized, the surface active agent and the mixed solvent are volatilized as a vapor from the first paste 100. The vapor is finally absorbed by the porous sheet 106. Since the vapor is prevented from remaining retained in the first paste 100, the first paste 100 is prevented from cracking. Since the first paste 100 is pressurized while being covered with the polymer film 102 which has smooth surfaces, any thickness differences of the first paste 100 are reduced.

When the first paste 100 is thus dried, a water-repellent layer 30a containing carbon black and PTFE is formed on the base 6. The polymer film 102 and the porous sheet 106 may then be peeled respectively from the water-repellent layer 30a and the base 6. The polymer film 102 can easily be peeled off the water-repellent layer 30a.

In second step S20, a slight amount of solvent and surface active agent may remain in the water-repellent layer 30a. It is preferable to carry out first heating step S22 and second heating step S24 for volatilizing away the remaining amount of solvent and surface active agent substantially completely.

In first heating step S22, the assembly is held for a certain period of time at a temperature which is lower than the boiling point of the solvent and which provides a vapor pressure to sufficiently evaporate the solvent. When the assembly is heated at such a temperature, the solvent remaining in the water-repellent layer 30a is gradually, but not quickly, volatilized away. Consequently, the water-repellent layer 30a is prevented from cracking and also from being peeled off the base 6.

In second heating step S24, the assembly is held for a certain period of time at a temperature which is close to the boiling point of the surface active agent. When the assembly is heated at such a temperature, the surface active agent remaining in the water-repellent layer 30a is gradually volatilized away.

After second heating step S24, third heating step S26 should preferably be carried out to increase the water repellency of the water-repellent layer 30a.

In third heating step S26, the assembly may be heated at a temperature equal to or higher than the melting point (330 through 340° C.) of PTFE and lower than the thermal decomposition temperature (about 400° C.) of PTFE. However, if the assembly were heated at a temperature in excess of 350° C., then the water repellency of the water-repellent layer 30a would become too high. If a paste (second paste) for an electrode catalyst layer were coated on the water-repellent layer 30a thus heated, then since the second paste would be repelled by the water-repellent layer 30a, the electrode catalyst layer 32a would easily tend to crack. The bonding strength between the second paste and the water-repellent repellent layer 30a would become so weak that the electrode catalyst layer 32a would easily be peeled off the water-repellent layer 30a. For this reason, the assembly should preferably be heated at a temperature ranging from 340 to 350° C.

The water-repellent layer 30a thus formed has cracks which reach about 0.3 to 2%, or less than 5% at maximum, of the total area of the water-repellent layer 30a, and has maximum and minimum thicknesses that differ from each other by about 30 µm, or less than 40 µm at maximum.

Figure 6:
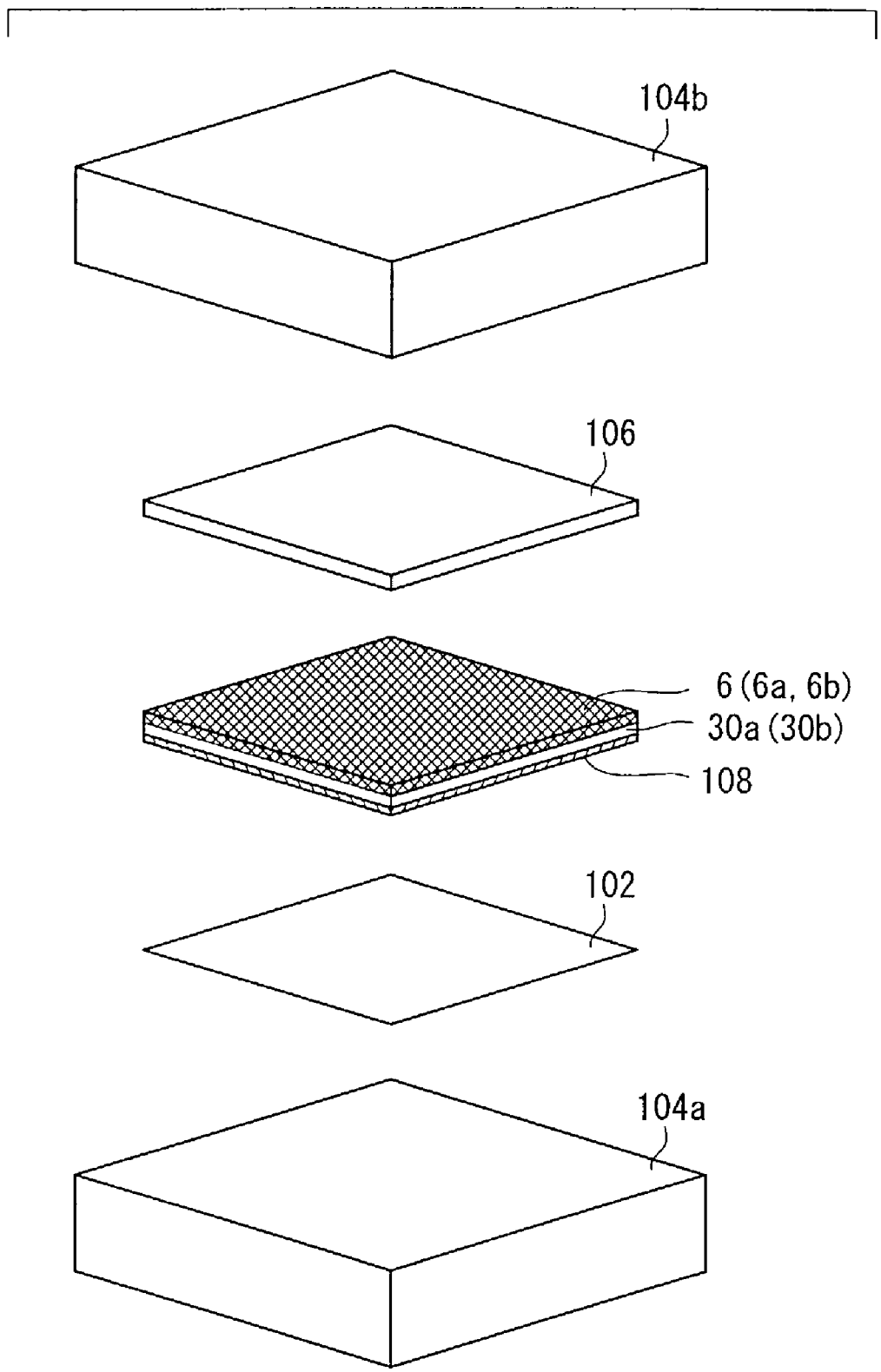
FIG. 6 is an exploded perspective view, partly omitted from illustration, also showing the manner in which the water-repellent layer of the electrode in the fuel cell shown in FIG. 2 is produced.

The electrode catalyst layer 32a is formed on the water-repellent layer 30a. Specifically, in third step S30, a second paste 108 shown in FIG. 6 is coated on the water-repellent layer 30a preferably according to a screen printing process. As with the first paste 100, the second paste 108 should preferably be coated in repeated coating and drying cycles. When the second paste 108 is dried, it is not necessary to pressurize the second paste 108 and the base 6. The second paste 108 may be prepared by dispersing particles of a carbon material such as carbon black carrying Pt and particles of PTFE in a mixed solvent of pure water and ethylene glycol or the like.

After the second paste 108 is coated to a predetermined thickness on the water-repellent layer 30a, the second paste 108 is dried while it is being pressurized in the same manner as with second step S20. Specifically, the second paste 108 coated on the water-repellent layer 30a is covered with a polymer film 102. Then, as shown in FIG. 6, the assembly is placed on the lower press plate 104a with the polymer film 102 being positioned downwardly, and a porous sheet 106 is placed on the base 6.

The base 6, the water-repellent layer 30a, and the second paste 108 are heated while being pressurized by the lower press plate 104a and the upper press plate 104b. The base 6, the water-repellent layer 30a, and the second paste 108 are heated and pressurized under a load at a temperature for a period of time which are not uniquely determined, but selected depending on the type of the solvent and the amount of the second paste 108 to be dried.

When the base 6, the water-repellent layer 30a, and the second paste 108 are heated and pressurized, the mixed solvent is volatilized as a vapor from the second paste 108.

The vapor is finally absorbed by the porous sheet 106 in the same manner as when the first paste 100 is dried in second step S20. Since the vapor is prevented from remaining retained in the second paste 108, the second paste 108 is prevented from cracking. Since the second paste 108 is pressurized while being covered with the polymer film 102 which has smooth surfaces, any thickness differences of the second paste 108 are reduced.

When the second paste 108 is thus dried, an anode electrode 24 is produced which comprises the base 6 serving as the gas diffusion layer 6a, the water-repellent layer 30a disposed on the gas diffusion layer 6a, and the electrode catalyst layer 32a disposed on the water-repellent layer 30a and made of carbon black carrying Pt and PTFE. The polymer film 102 and the porous sheet 106 may then be peeled respectively from the electrode catalyst layer 32a and the gas diffusion layer 6a. The polymer film 102 can easily be peeled off the electrode catalyst layer 32a.

When electrode catalyst layer 32a is formed from the first paste 108, the solvent may remain in the eletrode catalyst layer 32a in the same manner as when the water-repellent layer 30a is formed from the first paste 100. It is preferable to carry out fourth heating step S42 for volatilizing away the remaining amount of solvent substantially completely. In fourth heating step S42, the assembly is held for a certain period of time at a temperature which is lower than the boiling point of the solvent and which provides a vapor pressure to snfficienrly evaporate the solvent. When the assembly is heated at such a temperature, the electrode catalyst layer 32a is prevented from cracking and also from being peeled off the water-repellent layer 30a.

Since the water-repellent layer 30a has a small amount of cracking and small surface irregularities and the second paste 108 is pressurized while being covered with the polymer film 102, the electrode catalyst layer 32a also has a small amount of cracking and small surface irregularities. Specifically, the cracks of the electrode catalyst layer 32a reach about 2 through 7% of the total area of the electrode catalyst layer 32a. The electrode catalyst layer 32a has maximum and minimum thicknesses that differ from each other by about 20 μm.

The cathode electrode 26 can be fabricated in the same process as described above.

As described above, the fuel cell 20 which includes the anode electrode 24 and the cathode electrode 26 having the respective electrode catalyst layers 32a, 32b each having a small amount of cracking and small surface irregularities has a high output.

In the above embodiment, the fuel cell 20 comprises a stack of unit cells 22. However, as with the fuel cell (unit cell 1) shown in FIG. 9, the fuel cell may comprise a single unit cell.

EXAMPLES (1) Production of Fuel Cells 20:

60.6 weight % of PTFE particles having a diameter ranging from 200 to 300 nm, 5 weight % of a surface active agent, and 34.4 weight % of pure water were mixed into a PTFE dispersion. 49.5 parts by weight of the PTFE dispersion, 70 parts by weight of carbon particles having a diameter ranging from 10 to 30 nm, and 840 parts by weight of a solvent of ethylene glycol (the boiling point is 197° C.) were mixed, by stirring, into a first paste 100.

The first paste 100 was coated on a sheet of carbon paper (manufactured by Toray) having a length of 60 mm, a width of 60 mm, and a thickness of 270 μm according to the screen printing process. Thereafter, the coated sheet was heated at 350° C. for 20 minutes to dry the first paste 100, producing a first layer composed of 0.9 mg of carbon particles and 0.39 mg of PTFE particles that were dispersed per 1 $cm^2$ of carbon paper.

Then, the first layer was coated again with the first paste 100 according to a screen printing process, and thereafter the coated first paste 100 was dried by being heated at the same temperature for the same period of time as described above, thus forming a second layer composed of 0.6 mg of carbon particles and 0.27 mg of PTFE particles that were dispersed per 1 $cm^2$ of carbon paper.

The second layer was coated again with the first paste 100 according to the screen printing process, and thereafter the coated first paste 100 was dried by being heated at 350° C. for 20 minutes in the same manner as when the first and second layers were formed, thus forming a third layer composed of 0.5 mg of carbon particles and 0.22 mg of PTFE particles that were dispersed per 1 $cm^2$ of carbon paper.

The third layer was coated again with the first paste 100 according to the screen printing process to achieve proportions of 0.5 mg of carbon particles and 0.22 mg of PTFE particles.

The first paste 100 coated on the third layer was covered with a polymer film 102 of PTFE, and the assembly was placed on the lower press plate 104a with the polymer film 102 being positioned downwardly as shown in FIG. 5. Then, a sheet of cotton paper (porous sheet) 106 was placed on the carbon paper (base) 6. While the polymer film 102, the first paste 100, the carbon paper 6, and the cotton paper 106 were pressurized by the lower press plate 104a and the upper press plate 104b, they were heated to dry the first paste 100, producing a water-repellent layer 30a of carbon and PTFE. Specifically, they were pressurized under a load of 1.2 MPa, and heated at 130° C. for 4 minutes.

Then, the polymer film 102 and the cotton paper 106 were peeled off the water-repellent layer 30a and the carbon paper 6, respectively. The polymer film 102 could easily be peeled off the water-repellent layer 30a. Since the cotton paper 106 contained moisture, it was recognized that the cotton paper 106 had trapped ethylene glycol and water vapor.

The remaining solvent and the remaining surface active agent were volatilized away. For the purposes of increasing the water repellency of the water-repellent layer 30a and increasing the bonding strength of the water-repellent layer 30a with respect to the carbon paper 6, the assembly was heated successively at 120° C. for 10 minutes, then at 250° C. for 10 minutes, and finally at 350° C. for 20 minutes. The composition ratio of PTFE in the water-repellent layer 30a was 30 weight %, and the carbon particles and the PTFE particles were dispersed in respective proportions of 2.5 mg and 1.1 mg per 1 $cm^2$ of carbon paper.

30 semiproducts each having the water-repellent layer 30a were prepared, and their water-repellent layers 30a were observed for cracks using a digital high-density microscope manufactured by Keyence Corporation. It was found that the ratio of the area of the observed cracks to the total area of the water-repellent layer 30a was in the range from 0.3 to 2%.

Then, 25 parts by weight of Pt-carrying carbon particles having a diameter ranging from 25 to 35 nm, which comprised of 15 parts by weight of carbon particles and 10 parts by weight of Pt carried thereby, 1.5 parts by weight of PTFE particles having a diameter ranging from 250 to 300 nm, and 120 parts by weight of ethylene glycol were mixed, by stirring, into a second paste 108.

The second paste 108 was coated on the water-repellent layer 30a according to the screen printing process, and then dried by being heated at 65° C. for 30 minutes. The above cycle was repeated three times to form first through third layers. In each of the first through third layers, there were dispersed 0.38 mg of Pt-carrying carbon particles per 1 cm² of carbon paper.

Finally, the third layer was coated with the second paste 108 according to the screen printing process to achieve a proportion of 0.36 mg of carbon particles. Thereafter, the second paste 108 was coated with a polymer film 102, and the assembly was placed on the lower press plate 104a with the polymer film 102 being positioned downwardly, as shown in FIG. 6. A sheet of cotton paper 106 was placed on the carbon paper 6. While the second paste 108, the water-repellent layer 30a, the carbon paper 6, and the cotton paper 106 were pressurized by the lower press plate 104a and the upper press plate 104b, they were heated to dry the second paste 108, producing an electrode catalyst layer 32a of Pt-carrying carbon and PTFE. Specifically, they were pressurized under a load of 2.1 MPa, and heated at 130° C. for 6 minutes.

Then, the polymer film 102 and the cotton paper 106 were peeled off the electrode catalyst layer 32a and the carbon paper 6, respectively. The polymer film 102 could easily be peeled off the electrode catalyst layer 32a. Since the cotton paper 106 contained moisture, it was recognized that the cotton paper 106 had trapped a vapor of ethylene glycol.

The remaining solvent was volatilized away. For the purpose of increasing the bonding strength of the electrode catalyst layer 32a with respect to the water-repellent layer 30a, the assembly was heated at 120° C. for 20 minutes. The composition ratio of PTFE in the electrode catalyst layer 32a was 6 weight %, and the Pt-carrying carbon particles were dispersed in a proportion 1.5 mg per 1 cm² of carbon paper.

30 electrodes for a fuel cell (anode electrodes 24 and cathode electrodes 26) in which the carbon paper 6 served as the gas diffusion layer 6a, and the water-repellent layer 30a and the electrode catalyst layer 32a were laminated successively in the order named on the gas diffusion layer 6a were prepared. Their electrode catalyst layers 32a were observed for cracks using a digital high-density microscope manufactured by Keyence Corporation. It was found that the ratio of the area of the observed cracks to the total area of the electrode catalyst layer 32a was in the range from 0.3 to 2%.

The electrodes were cut off, and measured for the thicknesses of the water-repellent layers 30a and the electrode catalyst layers 32a using an electron microscope. The thicknesses of the water-repellent layers 30a ranged from 50 to 80 µm, and the thicknesses of the electrode catalyst layers 32a ranged from 30 to 50 µm. Therefore, the differences between the maximum and minimum thicknesses of the water-repellent layers 30a and the electrode catalyst layers 32a were 30 µm and 20 µm, respectively.

A membrane of polybenzimidazole (basic polymer) having a vertical dimension of 60 mm, a horizontal dimension of 60 mm, and a thickness of 50 µm was weighed, and then dipped in a phosphoric acid solution having a concentration of 85% for 24 hours or more to cause the concentration of the phosphoric acid in the membrane to reach equilibrium, producing a composite electrolyte 4 where the membrane was impregnated with the phosphoric acid. The composite electrolyte 4 was dried in vacuum at 80° C., and weighed again. The weight of the composite electrolyte 4 and the weight of the membrane before it was dipped in the phosphoric acid solution were compared with each other, thus calculating the number of moles of the phosphoric acid in the composite electrolyte 4. The number of molecules of the phosphoric acid per structural unit of polybenzimidazole, as calculated from the number of moles, was 10.2.

Figure 7:
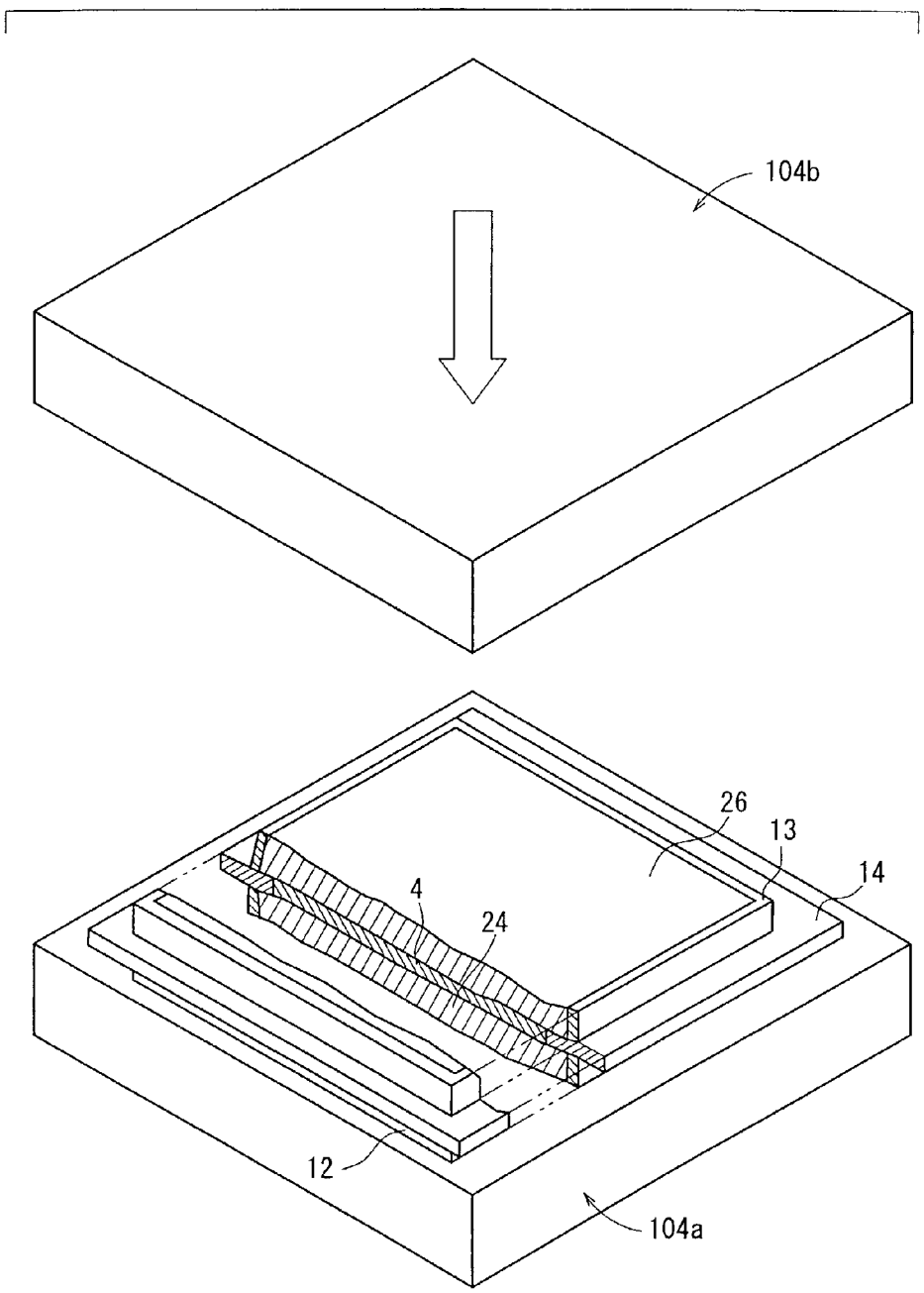
FIG. 7 is a perspective view, partly cut away, showing the manner in which the electrolyte electrode assembly shown in FIG. 2 is fabricated.

The anode electrode 24, the composite electrolyte 4, and the cathode electrode 26 were placed respectively in the seals 12, 14, 13, as shown in FIG. 7. Thereafter, the anode electrode 24 was placed on a lower press plate 104a of a press, not shown, such that the electrode catalyst layer 32a was positioned upwardly, and the composite electrolyte 4 and the cathode electrode 26 were placed in the order named on the anode electrode 24. The cathode electrode 26 was placed such that the electrode catalyst layer 32b was positioned downwardly.

The assembly was then pressed and heated between the lower press plate 104a and an upper press plate 104b under a pressure of 4 MPa at a temperature of 160° C. for 30 seconds. The anode electrode 24 and the cathode electrode 26 were integrally joined to the respective opposite surfaces of the composite electrolyte 4, producing an electrolyte electrode assembly 28 where the composite electrolyte 4 was accommodated in the seal 14 and the anode electrode 24 and the cathode electrode 26 were accommodated respectively in the seals 12, 13.

Then, separators 8a, 8b with gas passages 11a, 11b defined therein were placed against the respective opposite surfaces of the electrolyte electrode assembly 28. Collector electrodes 9a, 9b, insulating plates (not shown), and end plates 10a, 10b are then placed against outer sides of the separators 8a, 8b, and the end plates 10a, 10b are coupled to each other by bolts, not shown, thus producing a fuel cell 20 which comprised a single unit cell 22.

The peripheral devices shown in FIG. 3 were combined with the fuel cell 20 thus produced, making up a fuel cell system 40. The fuel cell system 40 will be referred to as Inventive Example.

For comparison purposes, a fuel cell system was constructed in the same manner as with Inventive Example except that it used an anode electrode 2 and a cathode electrode 3 having water-repellent layers and electrode catalyst layers 7a, 7b formed by drying the first paste 100 and the second paste 108 without pressurizing them. The fuel cell system thus constructed will be referred to as Comparative Example.

The areas of cracks in the water-repellent layers and electrode catalyst layers 7a, 7b of Comparative Example were inspected in the same manner as described above. The ratios of the areas of cracks in the water-repellent layers and electrode catalyst layers 7a, 7b to the total areas of the water-repellent layers and electrode catalyst layers 7a, 7b were in the range from 5 to 15% and the range from 10 to 30%, respectively, which were much greater than the area of cracks of Inventive Example. The thicknesses of the water-repellent layers ranged from 20 to 80 µm, and the thicknesses of the electrode catalyst layers 7a, 7b ranged from 20 to 60 µherefore, the differences between the maximum and minimum thicknesses of the water-repellent layers and the electrode catalyst layers 7a, 7b were 60 µm and 40 µm, respectively, which were greater than those of Inventive Example.

It can be seen from the above results that it is possible to fabricate high-quality water-repellent layers 30a, 30b and electrode catalyst layers 32a, 32b by pressurizing and heating the first and second pastes 100, 108 covered with the polymer film 102 and the base 6 covered with the porous sheet 106.

(2) Operation of the Fuel Cell Systems 40 According to Inventive Example and Comparative Example:

The fuel cell systems according to Inventive Example and Comparative Example were supplied with hydrogen and air such that a gas utilization factor defined by multiplying, by 100, a value produced by dividing an amount of gas consumed in a reaction by an amount of gas supplied to the reaction was 67% on the anode electrodes 2, 24 and 50% on the cathode electrodes 3, 26, while the temperature of the fuel cells 20 was maintained at 160° C. by the temperature control system 80. At that time, the hydrogen was supplied to the anode electrodes 2, 24 under a pressure of 200 kPa (absolute pressure) and the air was supplied to the cathode electrodes 3, 26 under a pressure of 200 kPa. That is, the fuel cell systems 40 were operated at various current densities under equalized absolute pressures at the anode and cathode electrodes. The pressures under which the hydrogen and the air were supplied were determined from values measured by the inlet pressure sensors 66a, 66b.

Figure 8:
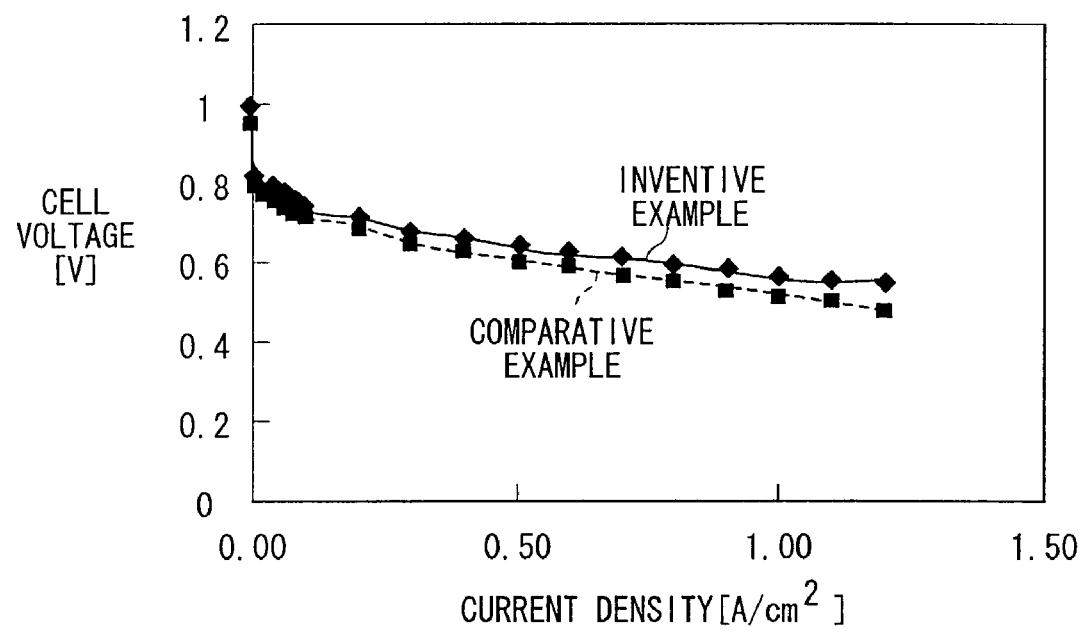
FIG. 8 is a graph showing the relationships between the current density and the cell voltage in fuel cell systems according to Inventive Example and Comparative Example.

The relationships between the current density I and the cell voltage V in the fuel cell systems according to Inventive Example and Comparative Example are shown in FIG. 8. It can be seen from FIG. 8 that the cell voltage V in the fuel cell system 40 according to Inventive Example is higher than the cell voltage V in the fuel cell system according to Comparative Example, i.e., the fuel cell system according to Inventive Example produces a higher output than the fuel cell system according to Comparative Example.

A review of FIG. 8 also indicates that as the current density I increases, the cell voltage V in the fuel cell system according to Comparative Example drops to a large extent, whereas the cell voltage V in the fuel cell system 40 according to Inventive Example drops to a relatively small extent. It can thus be seen that the fuel cell system 40 according to Inventive Example can achieve a high output even when the current density I is large.

According to the present invention, as described above, since the water-repellent layer is interposed between the gas diffusion layer and the electrode catalyst layer, the liquid electrolyte is prevented from seeping out by the water-repellent layer even when the amount of generated $H_2O$ increases when the fuel cell system is operated to generate electricity at a high current density. Since the water-repellent layer suffers a small amount of cracking and small surface irregularities, the electrode catalyst layer on the water-repellent layer also suffers a small amount of cracking and small surface irregularities. Inasmuch as the electrode catalyst layer has a good electric conductivity and a good charge distribution, the internal resistance of the fuel cell is reduced. Therefore, the fuel cell is capable of producing a high output even when it is operated to generate electricity at a high current density.

According to the present invention, furthermore, the paste which will serve as the water-repellent layer and the electrode catalyst layer is covered with the polymer film, and the base coated with the paste is covered with the porous sheet, and they are heated and pressurized to dry the paste. Since a vapor generated from the paste when the paste is dried is trapped by the porous sheet, the vapor is prevented from remaining in the paste. Accordingly, because the water-repellent layer and the electrode catalyst layer are prevented from cracking due to the vapor which would otherwise remain in the paste, the water-repellent layer and the electrode catalyst layer suffer a small amount of cracking and small surface irregularities.

Although certain preferred embodiments of the present invention have been shown and described in detail, it should be understood that various changes and modifications may be made therein without departing from the scope of the appended claims.

What is claimed is:

1. A method of manufacturing an electrode for use in a fuel cell, comprising the steps of:
    (a) coating a first paste containing a carbon material and polytetrafluoroethylene on a base which will serve as a gas diffusion layer;
    (b) pressurizing while heating the coated first paste to volatilize a solvent as a vapor from said first paste, and drying the coated first paste into a water-repellent layer;
    (c) coating a second paste containing a carbon material carrying a catalyst on said water-repellent layer;
    (d) pressurizing while heating the coated second paste to volatilize a solvent as a vapor from said second paste, and drying the coated second paste into an electrode catalyst layer;
    (e) carrying out said step (d) while said base is being interposed between a porous sheet and a polymer sheet covering said second paste, said porous sheet being a separate sheet from said base, wherein said solvent volatilized as said vapor from said second paste is absorbed in said porous sheer; and
    (f) peeling off said polymer sheet and said porous sheet absorbing said vapor therein from said base after said electrode catalyst layer is formed by driving.

2. A method according to claim 1, wherein said step (b) is carried out while said base is being interposed between a porous sheet and a polymer sheet covering said first paste, said porous sheet being a separate sheet from said base, wherein said solvent volatilized as said vapor from said first paste is absorbed in said porous sheet, and said porous sheet absorbing said vapor therein is pealed off from said base after said electrode catalyst layer is formed by drying.

3. A method according to claim 1, wherein said second paste is coated and dried in at least one cycle between said step (c) and said step (d).

4. A method according to claim 1, wherein said first paste is coated and dried in at least one cycle between said step (a) and said step (b).

5. A method according to claim 1, further comprising the steps of:
    after said step (b), heating the assembly to remove a remaining solvent from said water-repellent layer and heating the assembly to increase water repellency of said water-repellent layer and bonding strength of said water-repellent layer with respect to said base at different temperatures, respectively.

6. A method according to claim 1, further comprising the step of:
    after said step (e), heating the assembly to remove a remaining solvent from said electrode catalyst layer.

7. A method according to claim 1, wherein said water-repellent layer contains polytetrafluoroethylene in a range from 10 to 40 weight%.

* * * * *